United States Patent [19]

Short

[11] Patent Number: 4,808,817
[45] Date of Patent: Feb. 28, 1989

[54] ROTATIONAL ACCELERATION DETECTOR WITH MICRODOT CODING

[75] Inventor: Keith E. Short, Rockford, Ill.

[73] Assignee: Sundstrand Corporation, Rockford, Ill.

[21] Appl. No.: 124,072

[22] Filed: Nov. 23, 1987

[51] Int. Cl.⁴ .............................................. G01D 5/34
[52] U.S. Cl. ........................ 250/231 SE; 250/237 G
[58] Field of Search ............. 250/231 SE, 237 G; 356/395; 73/655, 656, 657; 33/125 C

[56] References Cited

U.S. PATENT DOCUMENTS

| | | | |
|---|---|---|---|
| 2,959,956 | 11/1960 | Sweeney et al. | 73/71.3 |
| 4,080,823 | 3/1978 | Stargardter | 73/71.3 |
| 4,243,734 | 1/1981 | Dillon . | |
| 4,334,152 | 6/1982 | Dakin et al. | 250/226 |
| 4,342,025 | 7/1982 | Spalti et al. | 340/347 P |
| 4,423,632 | 1/1984 | Madden et al. | 73/462 |
| 4,465,928 | 8/1984 | Breslow | 250/231 SE |
| 4,506,339 | 3/1985 | Kuhmlein | 364/565 |
| 4,518,859 | 5/1985 | Hoshika | 250/231 SE |
| 4,551,715 | 11/1985 | Durbin | 250/231 SE |
| 4,587,513 | 5/1986 | Burrowes et al. | 340/347 P |
| 4,602,155 | 7/1986 | Laplante | 250/231 SE |
| 4,644,545 | 2/1987 | Gershenson | 340/347 |

FOREIGN PATENT DOCUMENTS 6033012  2/1985  Japan ................. 250/231 SE

Primary Examiner—David C. Nelms
Assistant Examiner—Jess Ruoff
Attorney, Agent, or Firm—Wood, Dalton, Phillips, Mason & Rowe

[57] ABSTRACT

A system for detecting angular, radial and axial accelerations of rotating machinery parts to facilitate vibrational analysis of the parts. An annular array of micro dots is disposed on the rotating machinery part generally concentric with the axis of rotation of the part. A stationary high resolution photodetector is located for reading the micro dot patterns of movement of the annular array of dots as the array tangentially passes the photodetector. A conditioning circuit is coupled to the detector for conditioning a signal received from the detector.

14 Claims, 1 Drawing Sheet

ROTATIONAL ACCELERATION DETECTOR WITH MICRODOT CODING

FIELD OF THE INVENTION

This invention is directed to a rotational acceleration system to detect the motion of a micro dot array attached to a rotating device.

BACKGROUND OF THE INVENTION

The development of quiet rotating machinery is extremely difficult because the static measurement of fabrication accuracy does not always correlate to how quiet or noisy a component will be during operation. Noise usually is created in rotating parts of machinery when the parts are not balanced and do not rotate about their intended axis of rotation or about their center of mass.

Vibrational analysis of a machine and/or its rotating parts in operation does not always pinpoint imbalance problems. General vibrational data can be made available to generally locate design or fabrication problems, somewhat similar to known vehicular tire balancing appartus. However, attempts at analyzing detailed motion of rotating parts of machinery is rarely attempted. Consequently, expensive high tolerance parts often are substituted where they might not actually be required if detailed motion of the rotating parts could pinpoint the design or fabrication problems.

There is a need for a device or system to facilitate the analysis of and/or measuring of angular, radial and axial accelerations of a rotating body that would have the capability of detecting high frequency motions caused by gear, bearing and balance problems.

This invention is directed to satisfying such a need and solving the above-identified problems in rotating machinery.

SUMMARY OF THE INVENTION

An object, therefore, of the invention is to provide a system for detecting angular, radial and axial accelerations of rotating machinery parts and the like to facilitate vibrational analysis of the parts.

Generally, the invention contemplates providing an annular array of micro dots on the rotating machinery part generally concentric with the axis of rotation thereof. A stationary high resolution photodetector is located for reading the micro dot patterns of movement of the annular array as the array tangentially passes the photodetector. Conditioning means are provided for conditioning a signal received from the photodetector.

The invention also contemplates the disposition of the micro dots on a separate strip, as by laser etching the array of dots in a high density pattern on the strip. The strip then can be placed at various locations on various shaped machinery parts. For instance, the strip may be wrapped around the outer surface of a cylindrically-shaped rotating part, such as a shaft. The strip may be placed in a circular array on an axial face of a disc-shaped rotating part, such as a gear. The annular array of micro dots may be laser-etched directly on the surface of the rotating part itself.

The conditioning means include amplification means and a pulse discriminator.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
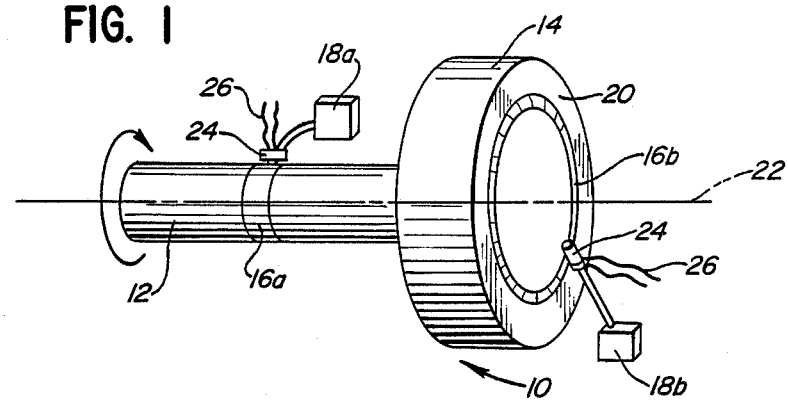
FIG. 1 is a somewhat schematic, perspective view of a rotating machinery part incorporating the concepts of the invention.

Referring to the drawings in greater detail, and first to FIG. 1, the invention is directed to a rotational acceleration detecting system for detecting angular, radial and axial accelerations of rotating machinery parts, such as a machinery part, generally designated 10, in order to facilitate vibrational analysis of the rotating part. The machinery part may comprise a variety of components, such as gears, bearings, shafts, turbines or the like. As for example, FIG. 1 shows a shaft 12 for rotating a component 14. Component 14 may be a gear, a turbine, a larger diameter shaft, or a variety of other machinery parts.

The invention contemplates disposing an annular array 16a,16b of high density micro dots on the machinery part, the array to be read by a high resolution photodetector 18a,18b. FIG. 1 is a somewhat schematic illustration and the showing of two micro dot arrays 16a and 16b along with their respective photodetectors 18a and 18b is somewhat redundant The depiction is for illustration purposes to show the application of the invention on various types of machinery parts.

Specifically, micro dot array 16a is shown as a band about the outer diameter surface of cylindrically shaped shaft 12. Micro dot array 16b is shown in a circular array as disposed on a flat face 20 of a gear, for instance. In either event, the arrays are intended to be concentric about the axis of rotation 22 of the machinery part Furthermore, the invention contemplates the disposition of the dot patterns on a strip, such as a plastic film, which can be attached to the rotating part. The dot patterns may be generated by a laser beam on the plastic film and then attached to the rotating part at appropriate locations, as described in relation to arrays 16a wrapped about shaft 12 and 16b on the face of gear 20. The dot patterns also may be generated by a laser beam directly onto a properly prepared surface of the rotating part itself Photodetectors 18a,18b are high resolution, microchip photodetectors which are located such that the respective micro dot patterns pass the head 24 of the photodetector in a tangential direction. The photodetectors are stationary and read the micro dot patterns of movement of the array of micro dots 16a,16b as the array tangentially passes the detector during rotation of the parts. The detector(s) generates an electronic signal, as at 26 (FIG. 1).

In essence, photodetectors 18a,18b sense or detect minute variations from the mean angular velocity of the micro dot patterns tangentially passing the detector In other words, axial, radial and angular variances can be detected and the microchips accordingly generate electronic signals as the detector(s) tracks the movement of the micro dot patterns in relation to a mean parameter.

Figure 2:
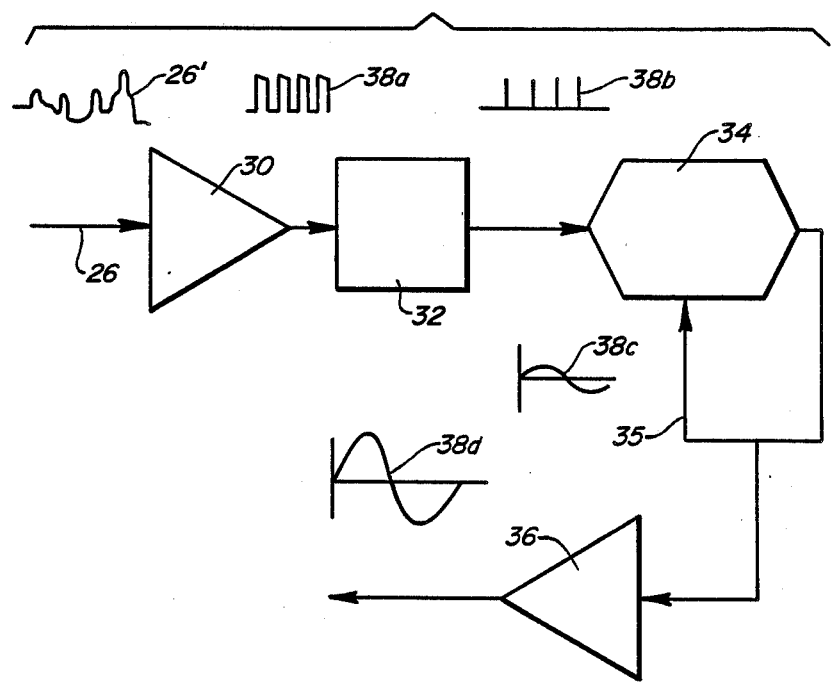
FIG. 2 is a block diagram of a conditioning means for receiving a signal from the photodetector means at the rotating part.

FIG. 2 shows one type of conditioning means for conditioning signal 26 from one of the microdetectors 18a, 18b. The conditioning means include an amplifier 30 coupled to a pulse discriminator 32 which, in turn, is coupled to a phase-locked loop 34. The phase-locked loop includes a loop error circuit 35 whereupon the signal is fed to a second amplifier 36. The result is that signal 26' coming from the photodetector is conditioned through the circuit as indicated graphically at 38a,38b,38c,38d as the signal is conditioned through the circuit to a usable mode indicating acceleration. This signal then can be measured and/or compared to a mean signal to determine appropriate variances or imbalances. Speed and acceleration can be measured by digital signal counting, i.e. as the dots pass the detector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A system for detecting angular, radial and axial accelerations of rotating machinery parts and the like to facilitate vibrational analysis of the parts, comprising:

an annular array of micro dots disposed on the rotating machinery part generally concentric with the axis of rotation thereof;

stationary high resolution photodetector means located for reading micro dot patterns of movement of said annular array thereof as the array tangentially passes the photodetector means; and conditioning means coupled to the photodetector for conditioning a signal received from the photodetector means.

2. The system of claim 1 wherein said annular array of micro dots is disposed on a separate strip of material which, in turn, is disposed on the rotating part.

3. The system of claim 2 wherein said annular array of micro dots is laser etched on said strip.

4. The system of claim 1 wherein said annular array of micro dots is located about an outer diameter surface of a cylindrically-shaped rotating part.

5. The system of claim 1 wherein said annular array of micro dots is located on an axial face of a disc shaped rotating part.

6. The system of claim 1 wherein said annular array of micro dots is laser etched directly on a surface of the rotating part.

7. The system of claim 1 wherein said conditioning means include amplification means.

8. The system of claim 1 wherein said conditioning means include a pulse discriminator.

9. A system for detect angular, radial and axial accelerations of rotating parts and the like to facilitate vibrational an parts, comprising:

an annular array o laser etched on a strip of material disposed on a machinery part concentric with the axis of high resolution photo detector means located for reading micro dot patterns of movement of said annular array thereof as the array tangential the photodetector means; and conditioning means the photodetector means for conditioning a signal from the photodetector means.

10. The system of claim said strip is wrapped about an outer diameter s a cylindrically-shaped rotating part.

11. The system of claim said strip is attached to an axial face of a disc-shaped rotating part.

12. The system of claim 9 said conditioning means include amplification means.

13. The system of claim 9 wherein said conditioning means include a pulse discriminator.

14. The system of claim 9 said strip comprises a plastic film.

* * * * *